(12) United States Patent
Kim (10) Patent No.: US 9,719,455 B2
(45) Date of Patent: Aug. 1, 2017

(54) APPARATUS FOR PREVENTING JACKRABBIT ACCIDENT USING VEHICLE BLACK BOX

(71) Applicant: Mureung CO., LTD., Seoul (KR)

(72) Inventor: Il-Wong Kim, Gyeonggi-do (KR)

(73) Assignee: MUREUNG CO., LTD., Seoul (KR)

( * ) Notice: Subject to any disclaimer, the term of this patent is extended or adjusted under 35 U.S.C. 154(b) by 0 days.

(21) Appl. No.: 15/192,701

(22) Filed: Jun. 24, 2016

(65) Prior Publication Data

US 2017/0022925 A1    Jan. 26, 2017

(30) Foreign Application Priority Data

Jul. 22, 2015   (KR) .................. 10-2015-0103493

(51) Int. Cl.

| | |
|---|---|
| *G01M 17/00* | (2006.01) |
| *G06F 7/00* | (2006.01) |
| *G06F 11/30* | (2006.01) |
| *G06F 19/00* | (2011.01) |
| *G07C 5/00* | (2006.01) |
| *F02D 41/30* | (2006.01) |

(Continued)

(52) U.S. Cl.
CPC ......... *F02D 41/3082* (2013.01); *B60K 28/00* (2013.01); *B60K 28/14* (2013.01); *B60R 16/0231* (2013.01); *B60R 16/0232* (2013.01); *B60W 40/00* (2013.01); *F02D 41/045* (2013.01); *F02D 41/222* (2013.01); *G07C 5/08* (2013.01); *G07C 5/0808* (2013.01); *G07C 5/0816* (2013.01); *G07C 5/0866* (2013.01); *H04N 1/00127* (2013.01); *F02D 2041/227* (2013.01); *F02D 2200/602* (2013.01); *F02D 2200/606* (2013.01)

(58) Field of Classification Search
None
See application file for complete search history.

(56) References Cited

U.S. PATENT DOCUMENTS

2016/0154406 A1*   6/2016   Im .................. G05B 23/0221
                                                     702/188

FOREIGN PATENT DOCUMENTS

| KR | 1019990046468 | 7/1999 |
|---|---|---|
| KR | 1020010026291 | 4/2001 |

(Continued)

*Primary Examiner* — Lail Kleinman
(74) *Attorney, Agent, or Firm* — IP & T Group LLP (57) ABSTRACT

An apparatus for preventing a jackrabbit accident using a vehicle black box includes a jackrabbit accident prevention unit that is provided in the vehicle black box, synchronizes an accelerator position signal with a vertical synchronization signal for recording of an image to generate first jackrabbit analysis information to be transmitted to an accident record unit, combines the accelerator position signal with a throttle position signal to be transmitted to the accident record unit as second jackrabbit analysis information and to determine jackrabbit based on the second jackrabbit analysis information, and prevents the jackrabbit accident by automatically shutting off driving power to a fuel pump in the jackrabbit state, and the accident recording unit that provides horizontal and vertical synchronization signals for storing of an image to the jackrabbit accident prevention unit, maps the first jackrabbit analysis information with a recorded image, and stores the mapping result in a memory card.

10 Claims, 6 Drawing Sheets

(51) Int. Cl.
*F02D 41/22* (2006.01)
*G07C 5/08* (2006.01)
*B60R 16/023* (2006.01)
*B60K 28/00* (2006.01)
*B60K 28/14* (2006.01)
*B60W 40/00* (2006.01)
*H04N 1/00* (2006.01)
*F02D 41/04* (2006.01)

(56) References Cited

FOREIGN PATENT DOCUMENTS

| | | | | |
|---|---|---|---|---|
| KR | 1020120017690 | | 2/2012 | |
| KR | 1020130011076 | | 1/2013 | |
| KR | 101362857 | | 2/2014 | |
| KR | 101378998 | | 3/2014 | |
| KR | 20150026214 A | * | 3/2015 | ............. B60K 28/00 |
| KR | 1020150026214 | | 3/2015 | |

* cited by examiner

APPARATUS FOR PREVENTING JACKRABBIT ACCIDENT USING VEHICLE BLACK BOX

The present application claims priority under 35 U.S.C. §119 to Korean Patent Application No. 10-2015-0103493, filed on Jul. 22, 2015, which is herein incorporated by reference in its entirety.

BACKGROUND OF THE INVENTION

1. Field of the Invention

The present invention relates to the prevention of a jackrabbit accident using a vehicle black box, and more particularly to an apparatus for preventing a jackrabbit accident using a vehicle black box, capable of synchronizing an accelerator position signal, a throttle position signal, and a photographed image signal with each other in the vehicle black box, storing the synchronization result as analysis information used to determine a jackrabbit state of a vehicle, and automatically shutting off power to a fuel pump in vehicle jackrabbit to previously prevent an accident caused by the vehicle jackrabbit.

2. Description of the Related Art

In general, jackrabbit means that a vehicle moves forth or back for itself in the state that a driver neither presses an accelerator, nor manipulates a gearshift when a vehicle is started. If the vehicle moves forth or back regardless of the intention of the driver, the vehicle may collide with another object to be damaged. In addition, the driver of the vehicle or a walker may face a dangerous situation.

The causes of the jackrabbit are not clearly and completely investigated yet, but assumed as being made in the cases that 1) a driver erroneously manipulates vehicle components, 2) a vehicle has its own defects, 3) the vehicle components are defective due to deterioration thereof, 4) the vehicle is started due to the defects in the structure of the vehicle in the case that a transmission lever is located at P or N.

Among them, in the case that the vehicle components are defective due to the deterioration thereof, sensors, for example, an air temperature sensor (ATS), a water temperature sensor (WIS), a throttle position sensor (TPS), an oxygen sensor, and the like, provided in an engine to operate an air and fuel injection control device (ECU) may be deteriorated.

If the jackrabbit occurs in the vehicle, the vehicle may not be smoothly braked even if the driver attempts to brake the vehicle.

Meanwhile, related arts to prevent a jackrabbit accident of a vehicle are disclosed in patent document 1 (Korean Patent Unexamined Publication No. 10-2012-0017690 published on Feb. 29, 2012), patent document 2 (Korean Patent Unexamined Publication No. 10-2013-0011076 published on Jan. 30, 2013), and patent document 3 (Korean Patent Registration No. 10-1362857 issued on Feb. 7, 2014).

The related, art disclosed in patent document 1 provides an apparatus for preventing a vehicle jackrabbit in which, when a vehicle is broken due to the jackrabbit in a situation unintended by a driver, and a micro-computer instantly detects the jackrabbit to disconnect an ECU injection signal and output a preset CPU injection signal, so that the engine power of the vehicle is maintained at a constant speed, thereby smoothly coping with the jackrabbit situation.

According to the related art disclosed in patent document 2, in the state that an electrical error does not exist in a vehicle, when a vehicle is controlled by controlling an accelerator, at least one of an accelerator open value and a throttle valve open value is checked while the vehicle is controlled, the checked value is compared with a relevant learning value previously stored to determine the jackrabbit state of the vehicle, and the throttle opening is controlled with a value less than a preset open limit value to prevent the jackrabbit of the vehicle if the vehicle is determined as being in a jackrabbit state.

The related art in patent document 3 discloses an accelerator manipulation detection unit, which detects the manipulation state of an accelerator, and transmits a detection signal only to a driving controller so that the accelerator is not operated in cooperation with the ECU, a valve detection unit, which generates an electrical signal to stop an engine if an opening angle of a throttle valve is out of a normal range so that the throttle valve makes contact with a valve body, and a driving controller which determines a jackrabbit state according to a signal transmitted thereto from, the accelerator manipulation unit and the valve detection unit and stops the operation of the fuel pump in the jackrabbit. Accordingly, the jackrabbit is prevented by a mechanism independent from a control system provided in a vehicle, so that the stability and the reliability are ensured to prevent the jackrabbit.

However, according to the related arts to control the jackrabbit by performing injection control such as throttle control in a control device (for example, microcomputer) to control the vehicle if the vehicle jackrabbit is determined, the optimal jackrabbit control is not performed since the error of the control device is not considered.

In the related arts, the realization of the jackrabbit control by connecting another microcomputer with the injection device is not accepted by a vehicle manufacturer due to a vehicle structure, and such a structure may not be realized.

In addition, since the injection control such as the throttle control is performed in the jackrabbit state, the throttle control may not be performed normally in the abnormal situation of the jackrabbit In addition, the related art disclosed in patent document 3 does not provide an evidence material to investigate the jackrabbit.

SUMMARY OF THE INVENTION

The present invention is suggested in order to solve problems occurring in a jackrabbit preventing apparatus according to the related art, and to optimally stop a vehicle when jackrabbit occurs, and an object of the present invention is to provide an apparatus for preventing a jackrabbit accident using a vehicle black box, capable of synchronizing an accelerator position signal, a throttle position signal, and a photographed image signal with each other in the vehicle black box, storing the synchronization result as analysis information used to determine a jackrabbit state of a vehicle, and automatically shutting off power to a fuel pump in vehicle jackrabbit to prevent an accident caused by the vehicle jackrabbit.

Another object of the present invention is to provide an apparatus for preventing a jackrabbit accident using a vehicle black box, capable of determining a jackrabbit state by synchronizing a throttle position signal (throttle value open degree) and a vertical synchronization signal (V_sync.) to record an image of a black box, and of storing the throttle position signal and the accelerator position signal as jackrabbit analysis information.

Still another object of the present invention is to provide an apparatus for preventing a jackrabbit accident using a vehicle black box, capable of determining an Initial jackrabbit state based on a throttle position signal and an accelerator position signal, capable of storing relevant information by finally determining a vehicle state as a sudden acceleration state or a sudden braking state if a vehicle is returned to a normal state within a predetermined time after the determination of the initial jackrabbit state has been made, and enabling a driver to recognize the driving habit of the driver by informing a driving style of frequently causing the sudden acceleration state or the sudden braking state to the driver if the sudden acceleration state or the sudden braking state frequently occurs.

Still another object of the present invention is to provide an apparatus for preventing a jackrabbit accident using a vehicle black box, capable of exactly determining a jackrabbit state and the error state of an accelerator position sensor by combining an accelerator position signal and a throttle position signal, and capable of exactly informing the error state of the accelerator position sensor to the user when the accelerator position sensor is in the error state.

In order to accomplish the above objects, there is provided, an apparatus for preventing a jackrabbit accident using a vehicle black box, which includes a jackrabbit accident prevention unit that is provided in the vehicle black box, synchronizes an accelerator position signal with a vertical synchronization signal for recording of an image to generate first jackrabbit analysis information and to transmit the first jackrabbit analysis information to an accident record unit, combines the accelerator position signal with a throttle position signal to transmit the combination of the accelerator position signal and the throttle position signal, which serves as second jackrabbit analysis information, to the accident record unit and to determine jackrabbit based on the second jackrabbit analysis information, and prevents the jackrabbit accident by automatically shutting off driving power to a fuel pump when determination of the jackrabbit is made, and the accident recording unit that is provided in the vehicle black box, provides horizontal and vertical synchronization signals for storing of an image to the jackrabbit accident prevention unit, maps the first jackrabbit analysis information provided by the jackrabbit accident prevention unit with a recorded image, and stores the mapping result in a memory card.

The jackrabbit accident prevention unit includes an analog/digital converter that converts the accelerator position signal, which is transmitted from an accelerator position sensor to a main control unit (MCU) for controlling an overall operation of a vehicle, and the throttle position signal, which is transmitted from a throttle position sensor to the main control unit, into accelerator position data and throttle position data, respectively, and a jackrabbit accident controller that synchronizes the accelerator position data converted by the analog/digital converter with the vertical synchronization signal to generate the first jackrabbit analysis information, performs a logical operation with respect to the accelerator position data and the throttle position data to generate the second jackrabbit analysis information, determines an error state of an accelerator position sensor or a jackrabbit state based on the second jackrabbit analysis information, and performs a state indication and engine control operation according to the determination result.

The jackrabbit accident controller performs sampling with respect to the accelerator position data output from the analog/digital converter using the vertical synchronization signal to generate the first jackrabbit analysis information.

The jackrabbit accident controller performs sampling with respect to the throttle position data output from the analog/digital converter using the vertical synchronization signal, and performs an operation with respect to the sampling result and the first jackrabbit analysis information to generate the second jackrabbit analysis information used to determine the jackrabbit.

The jackrabbit accident controller transmits the accelerator position data and the throttle position data to the accident record unit such that the accelerator position data and the throttle position data are utilized to investigate the jackrabbit.

The jackrabbit accident controller determines the accelerator position sensor or a mechanical device related to the accelerator position sensor as being broken or in an abnormal state if the second jackrabbit analysis information represents a negative value, determines the accelerator position sensor or the mechanical device related to the accelerator position sensor as being in a normally operating state if the second jackrabbit analysis information represents a value less than a preset reference value to determine the jackrabbit, and determines the accelerator position sensor or the mechanical device related to the accelerator position sensor as being in an initial jackrabbit state if the second jackrabbit analysis information represents a value equal to or more than the preset reference value.

The jackrabbit accident controller checks continuity of the initial jackrabbit state if the determination, of the initial jackrabbit state is made to determine the initial jackrabbit state as a sudden acceleration state or a sudden braking state if the initial jackrabbit state is returned with the value less than the reference value within a preset time, and to determine the initial jackrabbit state as a final jackrabbit state if the initial jackrabbit state is continued for more than the preset time.

The jackrabbit accident controller adds up and stores a number of times of the sudden acceleration state or the sudden braking state into an internal memory if the final determination of the sudden acceleration state or the sudden braking state is made, and provides a driver with the added up and stored number of times of the sudden acceleration state or the sudden braking state as information of driving habit of the driver if the added up and stored number of times of the sudden acceleration or the sodden braking exceeds a preset number of times.

The jackrabbit accident prevention unit further includes a state indication and engine stop unit that leads the vehicle to operate in a safe mode by transmitting a jackrabbit determination signal to a vehicle control device provided in the vehicle if the jackrabbit accident controller makes determination of final jackrabbit, drives a state indicator, and generates a fuel pump power shutoff signal to stop the engine.

The apparatus further includes a sensor error state indicator to indicate the error state of the accelerator position sensor to an outside according to an indication control signal generated from the jackrabbit accident prevention unit, and a jackrabbit state indicator to indicate the jackrabbit state to the outside according to an indication control signal generated from the state indication and engine stop unit. The sensor error state indicator and the jackrabbit state indicator include light emitting diodes (LEDs).

In addition, the apparatus further includes a fuel pump power shut off unit that stops an engine by disconnecting a fuse for supplying driving power to the fuel pump according to a fuel pump power shutoff signal, which is generated from the jackrabbit accident prevention unit, to shut off the driving power supplied to the fuel pump.

The fuel pump power shutoff unit is interposed between a rear end of the fuse and a ground terminal, and includes a relay or a power transistor driven according to the fuel pump power shutoff signal to ground the fuse such that the fuse is disconnected.

As described above, according to the present invention, the accelerator position signal, the throttle position signal, and the photographed image signal are synchronized with each other in the vehicle black box to create and store analysis information used to determine the vehicle jackrabbit, so that the analysis information can be provided when a cause of the jackrabbit is investigated to determine jackrabbit in a vehicle jackrabbit accident thereafter.

In addition, according to the present invention, the power of the fuel pump is automatically shut off in vehicle jackrabbit, thereby preventing an accident caused by the jackrabbit.

In addition, according to the present invention, an operation is performed with respect to the throttle position signal and the accelerator position signal to extract jackrabbit analysis information, and the jackrabbit state is exactly determined based on the jackrabbit analysis information to control the vehicle. Accordingly, the vehicle accident caused by the jackrabbit and the safety of the driver can be ensured.

In addition, according to the present invention, the initial jackrabbit is determined based on the throttle position signal and the accelerator position signal, and the vehicle state is finally determined, as the sudden acceleration state or the sudden braking state if the vehicle is returned to a normal state within a predetermined time after the determination of the initial jackrabbit state has been made. If the sudden acceleration state or the sudden braking state frequently occurs, this fact is informed to the driver so that the driver can recognize the driving style of the driver.

Further, according to the present invention, the jackrabbit state and the error state of the accelerator position sensor can be exactly determined by combining the accelerator position signal, and the throttle position signal with each other, and the error state of the accelerator position sensor can be exactly informed to the driver when the accelerator position sensor is in the error state.

DETAILED DESCRIPTION OF THE INVENTION

Hereinafter, an apparatus for preventing a jackrabbit accident using a vehicle black box according to the exemplary embodiment of the present invention will be described in detail with reference to accompanying drawings.

Figure 1:
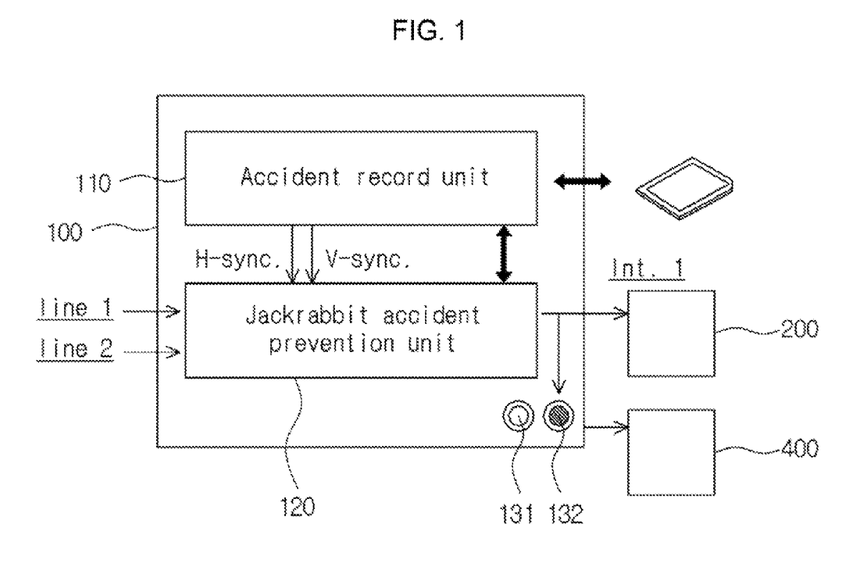
FIG. 1 is a view showing a block structure of an apparatus for preventing a jackrabbit accident using a vehicle black box according to an exemplary embodiment of the present invention.

FIG. 1 is a view showing a block structure of an apparatus for preventing a jackrabbit accident using a vehicle black box according to an exemplary embodiment of the present invention.

The apparatus for preventing the jackrabbit accident using the vehicle black box according to the present invention includes a black box 100 and a fuel pump power shutoff unit 511. In this case, the fuel pump power shutoff unit 200 may be realized using a power transistor (power TR.), or embedded in the black box 100 to be realized.

In addition, the apparatus for preventing the jackrabbit accident using the vehicle black box according to the present invention may further include a display device 400 to inform a user of a driving habit of the user. The display device 400 may be additionally provided, realized using a head unit such as an audio/image system basically mounted in a vehicle, or realized using a navigation added and used by a driver.

The black box 100 is a black box provided in a typical vehicle, and includes an accident record unit 110 and a jackrabbit accident prevention unit 120.

The accident record unit 110 stores an image according to a preset mode. Preferably, the accident record unit 110 provides horizontal and vertical synchronization signals to the jackrabbit accident prevention unit 120 to store the image, and stores first jackrabbit analysis information, which is provided from the jackrabbit accident prevention unit 120, and a recorded, image into a memory card by mapping the first jackrabbit analysis information with the recorded image. The accident record unit 110 has the same configuration as that provided in a typical black box, and performs the same function as that provided in a typical black box. The mode includes an event mode in which an image (that may include voice) is receded when an event occurs, and a regular mode in which an image is regularly recorded.

The jackrabbit accident prevention unit 120 synchronizes an accelerator position signal APS1 with a vertical synchronization signal V_sync, for recording an image to generate the first jackrabbit analysis information and to transmit the first jackrabbit analysis information to the accident record unit 110, combines the accelerator position signal AFS1 (Line1) with a throttle position signal TPS1 (Line2) to transmit the combination of the accelerator position signal AFS1 (Line1) and the throttle position signal TPS1 (Line2), which serves as the second jackrabbit analysis information, to the accident record unit 110 and to determine jackrabbit based on the second jackrabbit analysis information, and prevents the jackrabbit accident by automatically shutting off driving power of a fuel pump when the determination of the jackrabbit is made.

In this case, preferably, the accident record unit 110 and the jackrabbit accident prevention unit 120 are preferably embedded in the black box 100 as generally known to those skilled in the art. Typically, if vehicle jackrabbit occurs, a control device related to a vehicle may be erroneously operated. Therefore, when the jackrabbit is controlled by the control device related to the vehicle, a control operation may not be performed normally. According to the present invention, in order to solve the above problem and prevent the jackrabbit accident, an additional device such as the black box 100 operating regardless of the vehicle control device is used.

Figure 2:
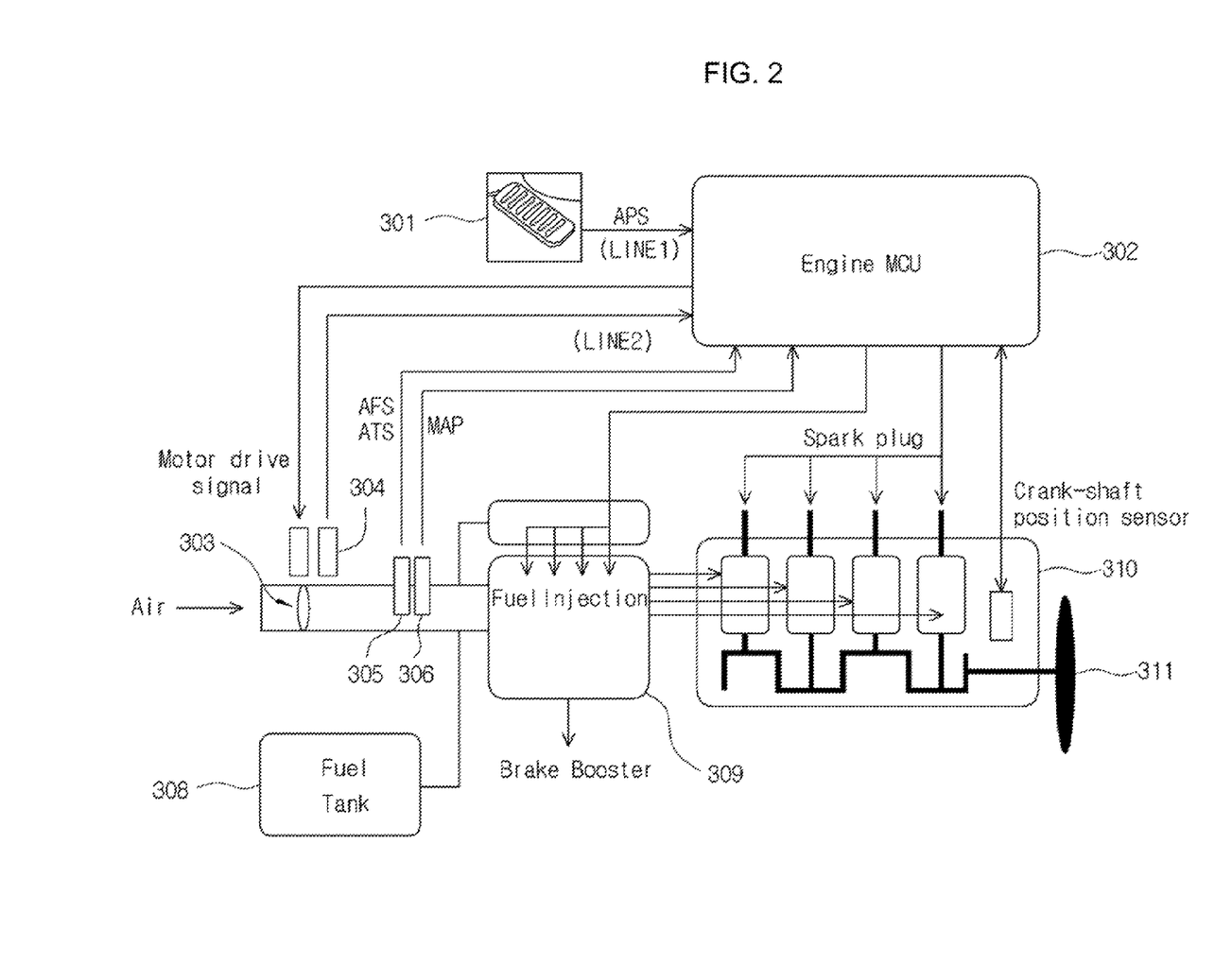
FIG. 2 is a view showing a schematic structure of an engine to explain a manner of acquiring an accelerator position signal and a throttle position signal in order to determine a jackrabbit state and the error state of an accelerator position sensor according to the present invention.
Figure 3:
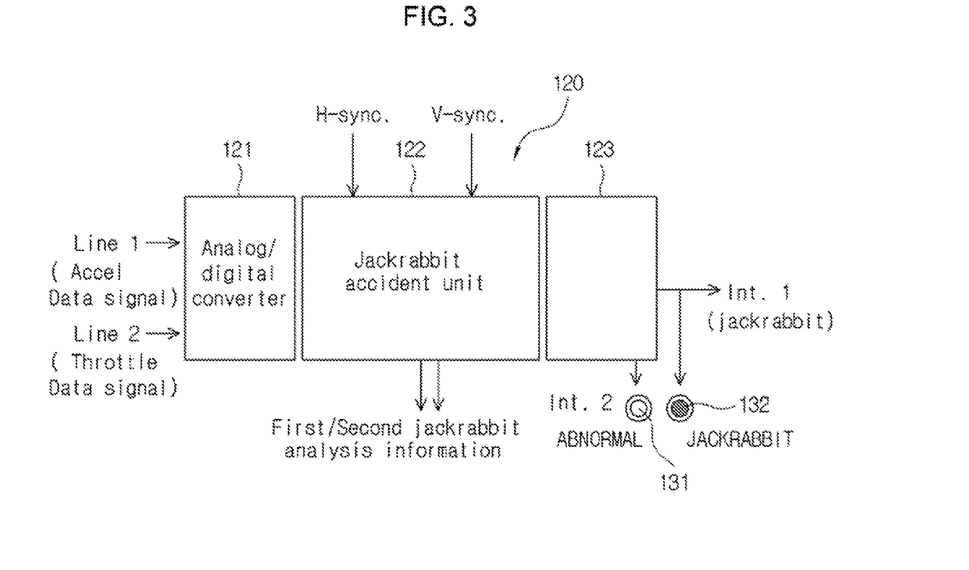
FIG. 3 is a view showing a block structure of a jackrabbit accident prevention unit of FIG. 1 according to the embodiment.

As shown in FIGS. 2 and 3, the jackrabbit accident prevention unit 120 includes an analog/digital converter 121 that converts the accelerator position signal (LINE1), which is transmitted from an accelerator position sensor 301 to an engine main control unit (MGU) 302 for controlling the overall operation of the vehicle, and the throttle position signal (LINE2), which is transmitted from a throttle position sensor 304 to the engine MCU 302, into accelerator position data and throttle position data, respectively, a jackrabbit accident controller 122 that synchronizes the accelerator position data converted by the analog/digital converter 121 with the vertical, synchronization signal V_sync. to generate the first jackrabbit analysis information, performs a logical operation with respect to the accelerator position data and the throttle position data to generate the second jackrabbit analysis information, determines an error state of an accelerator position sensor error or a jackrabbit state based on the second jackrabbit analysis information, and performs a state indication and engine control operation according to the determination result, a state indication and engine stop unit 123 that leads the vehicle to operate in a safe mode by transmitting a jackrabbit determination signal to a vehicle control device (for example, TCU or ECU) provided in the vehicle if the jackrabbit accident controller 122 makes the determination of the final jackrabbit, drives a state indicator, and generates a fuel pump power shutoff signal to stop the engine.

The jackrabbit accident controller 122 performs sampling with respect to the accelerator position data AFS1 output from the analog/digital converter 121 using the vertical synchronization signal to generate the first jackrabbit analysis information APS, performs sampling with respect to the throttle position data TPS1 output from the analog/digital converter 121 using the vertical synchronization signal, and performs an operation with respect to the sampling result (TPS) and the first jackrabbit analysis information to generate the second jackrabbit analysis information (jackrabbit signal) used to determine the jackrabbit.

Preferably, the jackrabbit accident controller 122 transmits the accelerator position data and the throttle position data to the accident recording unit 110 so that the accelerator position data and the throttle position data are used to determine the jackrabbit.

In addition, the jackrabbit accident controller 122 determines the accelerator position sensor or a mechanical device related to the accelerator position sensor as being broken or in an abnormal state if the second jackrabbit analysis information represents a negative (−) value, determines the accelerator position sensor or the mechanical device related to the accelerator position sensor as being in a normally operating state if the second jackrabbit analysis information represents a value less than a preset reference value (for example, 2.5) to determine the jackrabbit, and determines the accelerator position sensor or the mechanical device related to the accelerator position sensor as being in an initial jackrabbit state if the second jackrabbit analysis information represents a value equal to or more than the preset reference value.

The jackrabbit accident controller 122 checks continuity of the initial jackrabbit state if the determination of the initial jackrabbit state is made to determine the initial jackrabbit state as a sudden acceleration state or a sudden, braking state if the initial jackrabbit state is returned with the value less than the reference value within a preset time (for example, 1.5 seconds), and to determine the initial jackrabbit state as a final jackrabbit state if the initial jackrabbit state is continued for more than the preset time.

In addition, preferably, the jackrabbit accident controller 122 accumulates and stores the number of times of the sudden acceleration state or the sudden braking state into an internal memory if the final determination of the sudden acceleration state or the sudden braking state is made, and provides a driver with the accumulated and stored number of times of the sudden acceleration state or the sudden braking state as information of driving habit of the driver if the accumulated and stored number of times of the sudden acceleration or the sudden braking exceeds a preset number of times.

Meanwhile, the vehicle black box 100 further includes a sensor error state indicator 131 to indicate the error state of the accelerator position sensor to the outside according to an indication control, signal, generated from the jackrabbit accident prevention unit 120, and a jackrabbit state indicator 132 to indicate a jackrabbit state to the outside according to a display control, signal generated from the state indication and engine stop unit 123. The sensor error state indicator 131 and the jackrabbit state indicator 132 are preferably realized using a light emitting diode (LED).

In addition, the apparatus for preventing the jackrabbit accident using the vehicle black box according to the present invention further includes the fuel pump power shutoff unit 200 to stop an engine by disconnecting a fuse 312 for supplying driving power to the fuel pump according to a fuel pump shutoff signal, which is generated from the jackrabbit accident prevention unit 120, to shut off the driving power to the fuel pump.

Figure 5:
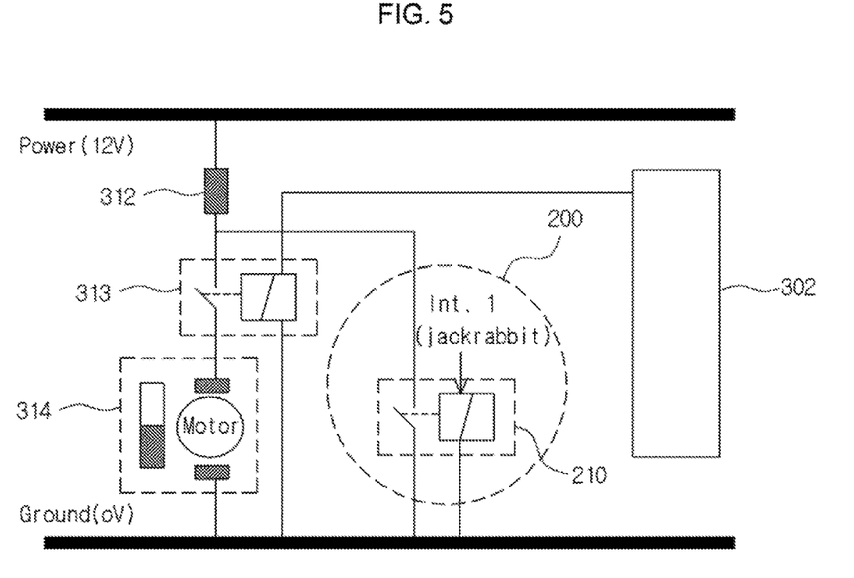
FIG. 5 is a view to explain a position of a fuel pump power shut off unit according to the present invention.

As shown in FIG. 5, the fuel pump power shutoff unit 200 is interposed between a rear end of the fuse 312 and the ground terminal, and includes a relay 210 or a power transistor driven according to the fuel pump power shutoff signal to ground the fuse 312 so that the fuse 312 is disconnected.

The operation of the apparatus for preventing the jackrabbit accident using the vehicle black box having the above configuration according to the exemplary embodiment of the present invention will be described in detail with reference to FIGS. 1 to 7.

As shown in FIG. 1 when a vehicle is started, the accident record unit 110 constituting the vehicle black box 100 performs the same function as that of a typical black box to record an image and/or voice. In particular, when an event, such as vehicle clash, occurs, the video and/or voice recorded for a predetermined time (for example, 10 seconds) before the event occurs is stored.

Meanwhile, when the vehicle is started, the jackrabbit accident prevention unit 120 embedded in the vehicle black box 100 receives the accelerator position signal APS1, which indicates the pressing degree of an accelerator, of the accelerator position signal Line1 from the accelerator position sensor.

In this case, as shown in FIG. 2 the accelerator position signal Line1 is a signal transmitted from the accelerator position sensor 301 to the vehicle engine MCU 302, which controls the overall operation of the vehicle, and a signal corresponding to the pressing degree of the accelerator.

As shown in FIG. 2, an engine part of a typical gasoline vehicle includes an engine MCU 302 to control an engine, a fuel tank 308, a fuel injection block 309, and a crank shaft part 310.

Figure 6:
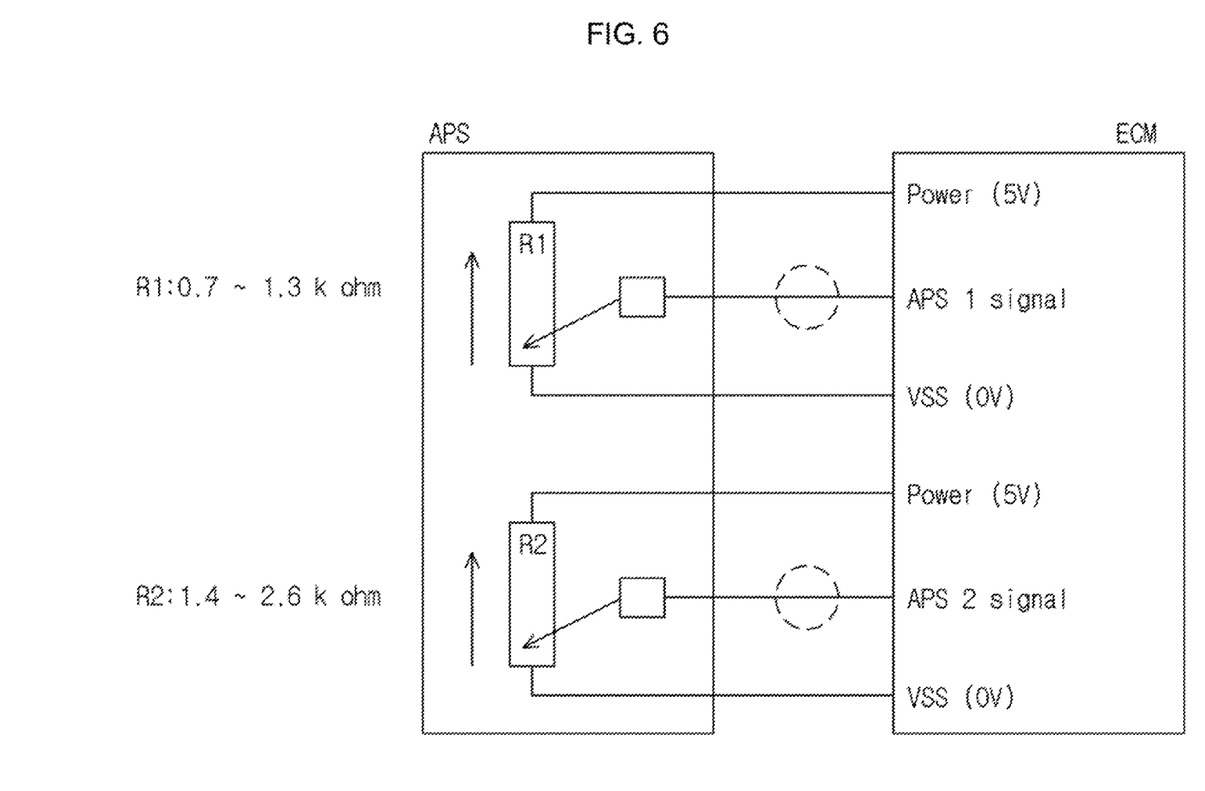
FIG. 6 is a view to explain lines used to acquire an accelerator position signal and a throttle position signal according to the present invention.

In addition, when an accelerator is pressed, the accelerator position sensor detects the pressing of the accelerator to transmit, the accelerator position signal. Line1 to the engine MCU 302. FIG. 6 is a schematic view to explain a procedure of transmitting the accelerator position signal detected by the accelerator position sensor to the engine MCU 301. In this case, an accelerator position signal APS1 and an accelerator position signal APS2 are combined with each other in a digital form to obtain the accelerator position signal.

Figure 4:
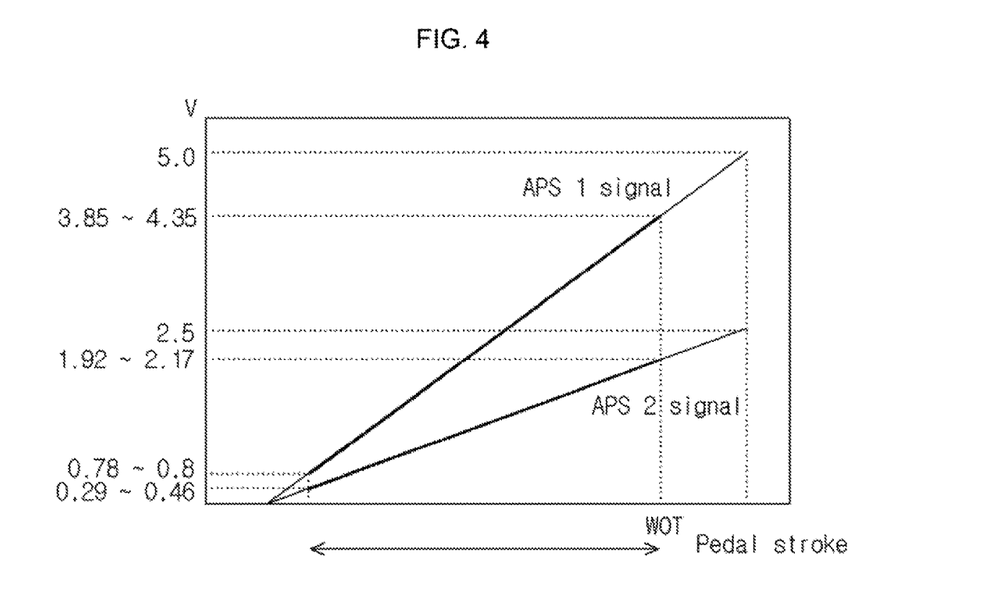
FIG. 4 is a graph to explain accelerator positions according to the present invention.

In addition, as shown in FIG. 4 the accelerator position signal has the range of 0 V to 5 V according to the manipulation of the accelerator. The two accelerator position signals APS1 and APS2 are generated by the accelerator position sensor. Among them, the accelerator position signal APS1 is used to determine the manipulation of the accelerator according to the present invention.

In addition, the opening degree of a throttle valve 303 is adjusted according to the control of the engine MCU 302, and the throttle position sensor 304 detects the opening degree of the throttle value 303 as the throttle position signal Line2 to be transmitted to the engine MCU 302.

In this case, according to the present invention, the accelerator position signal and the throttle position signal are not transmitted/received through individual, communication, between the black box 100 and the engine MCU 302, but an accelerator position signal input line and a throttle position signal input line positioned at front input terminals of the engine MCU 302 are connected with additional connection lines to be received in the black box 100. Accordingly, even when a vehicle control device such as the engine MCU 302 is erroneously operated, the black box 100 can exactly extract two signals.

As shown in FIG. 3, the jackrabbit accident prevention unit 120 converts an accelerator position signal (APS) Line1 output from the accelerator position sensor 301 and a throttle position signal Line2 output from the throttle position sensor 304 into corresponding digital data, that is, the accelerator position data APS1 and the throttle position data, respectively, through the analog/digital converter 121. The accelerator position signal input into the analog/digital converter 121 is an analog signal ranging from 0 V to 5 V according to the pressing degree of the accelerator. Similarly, the throttle position signal is an analog signal ranging from 0 V to 5 V according to the opening degree of the throttle valve. The analog/digital converter 121 converts the analog signals input thereto into corresponding digital signals, that is, the accelerator position data and the throttle position data to be transmitted to the jackrabbit accident controller 122.

Next, the jackrabbit accident controller 122 generates jackrabbit analysis information used to find out causes of the jackrabbit using the accelerator position data APS1, the throttle position data TPS1 output from the analog/digital converter 121 and the vertical synchronization signal V_sync. received from the accident record unit 110, determines the state of the jackrabbit, and performs jackrabbit indication and vehicle control when the jackrabbit occurs.

For example, the jackrabbit accident controller 122 performs sampling with respect to the accelerator position data APS1 every vertical synchronization signal (at most 30 frames; 30 frames/s) to synchronize the vertical synchronization signal with the accelerator position data. The digital accelerator position data acquired by synchronizing the accelerator position data with the vertical synchronization signal become the first jackrabbit analysis information APS.

The jackrabbit accident controller 122 transmit s the first jackrabbit analysis information APS to the accident record unit 110. The accident record unit 110 maps the first jackrabbit analysis information APS with the photographed image and stores the mapping result into a memory card. In other words, the time information of the vertical synchronization signal used when the first jackrabbit analysis information APS is created is mapped with the image corresponding to the relevant time information and the mapping result is stored in the memory card.

Figure 7:
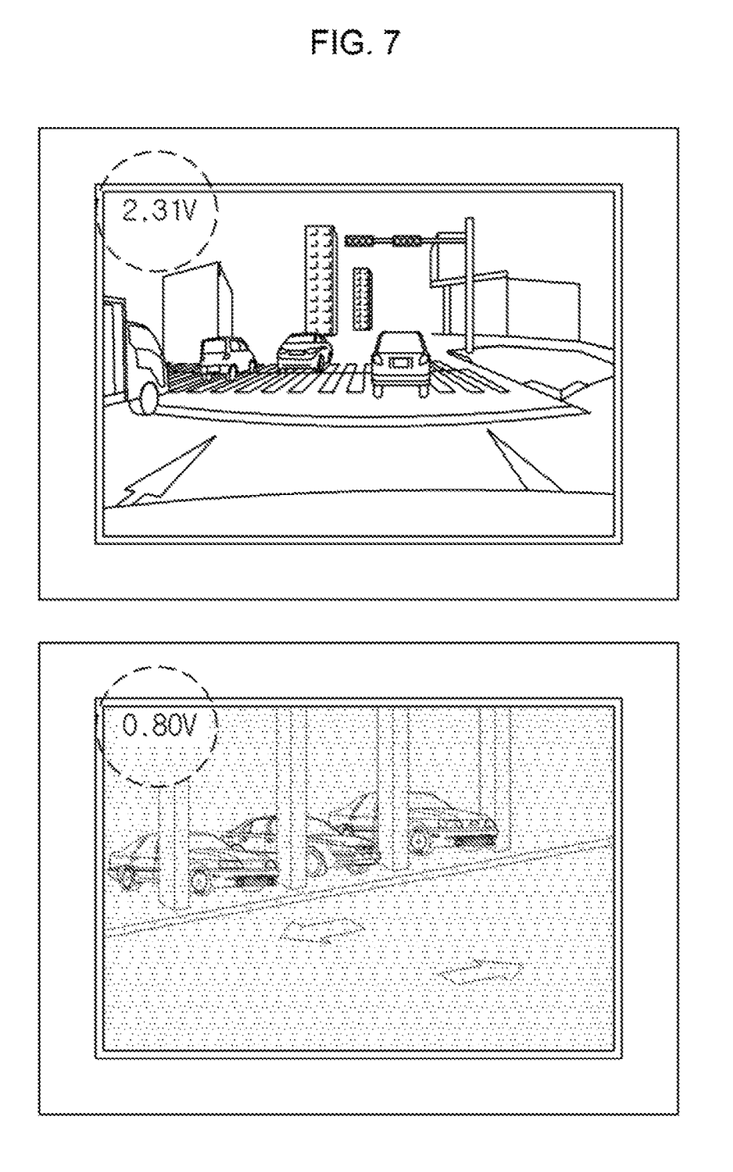
FIG. 7 is a view showing a recorded image having jackrabbit analysis information according to the present invention.

FIG. 7 shows images displayed on a screen as the first jackrabbit analysis information APS is mapped with the images corresponding to the same time as that of the first jackrabbit analysis information APS. In FIG. 7, 2.31 V or 0.8 V on the left upper end of the screen represents the first jackrabbit analysis information. In this case, 2.31 V represents the first jackrabbit analysis information when the accelerator is actually pressed, and 0.8 V is a basic value basically output from the accelerator position sensor even if the accelerator is not manipulated in the state that power is supplied.

Therefore, when the jackrabbit accident is investigated thereafter, the image stored in the vehicle black box 100 is checked as shown in FIG. 7, so that the state of the jackrabbit can be determined. In other words, the state of the jackrabbit may be determined by checking whether the vehicle driving is related to the pressing degree of the accelerator or an engine erroneously operates regardless of the pressing state of the accelerator, so that the jackrabbit state can be determined.

According to the present invention, the accelerator position signal becomes 0.8 V when the accelerator is not pressed, and becomes 4.10 V when the accelerator is pressed to the maximum. In addition, the pressing degree of the accelerator may be represented in Arabic numerals by finely dividing the voltage between 0.8 V to 4.10 V in the unit of $\frac{1}{100}$ V. In other words, a driver can determine the erroneous operation of the engine by checking the data representing the pressing degree of the accelerator and the motion on the screen with the naked eyes of the driver, in which the voltage is 0.80 V in stop driving or inertial driving, in the range of 0.81 V to 4.1 V during the driving, and 4.10 V in the maximum power.

Next, the jackrabbit accident controller 122 samples the throttle position data TPS1 output from the analog/digital converter 121 using the vertical synchronization signal, and performs an operation with respect to the sampling result TPS and the first jackrabbit analysis information APS to generate the second jackrabbit analysis information (jackrabbit signal) used to determine the jackrabbit. In other words, the jackrabbit accident controller 122 samples the throttle position data TPS1 every vertical synchronization signal (at most 30 frames; 30 frames/s) to synchronize the vertical synchronization signal with the throttle position data. The digital, throttle position data acquired by synchronizing the vertical synchronization signal with the throttle position data becomes a TP3. Thereafter, the first jackrabbit analysis information APS is subtracted from the throttle position data TPS, and the subtract result is generated, as the second jackrabbit analysis information (jackrabbit signal). In other words, the second jackrabbit analysis information, may be a voltage difference of a signal obtained after subtracting the first jackrabbit analysis information APS from the throttle position data TPS (TPS-APS).

In addition, the jackrabbit accident controller 122 transmits the accelerator position data AES1 and the throttle position data TPS1 to the accident record unit 110 so that the accelerator position data AFS1 and the throttle position data TPS1 are utilized when the jackrabbit is investigated.

In addition, the jackrabbit accident controller 122 determines a jackrabbit state, a sensor error state, a sudden acceleration state, or a sudden braking state based on the second jackrabbit analysis information (jackrabbit signal).

For example, if the second jackrabbit analysis information (jackrabbit signal) represents a negative (−) value, the accelerator position sensor or the mechanical, device related, to the accelerator position sensor is determined as being broken or in an abnormal state. In addition, if the accelerator position sensor or the mechanical device related to the accelerator position sensor is determined as being broken or in an abnormal state the sensor error state indicator 131 is turned on through the state indication and engine stop unit 123 to inform the driver of that the accelerator sensor or the mechanical device related to the accelerator sensor is in the abnormal state. In this case, the sensor error state indicator 131, which includes an LED, is turned on to indicate the sensor error or the machine failure state. As described above, the accelerator position sensor error state or the jackrabbit state is visually indicated, which is advantageous to the driver so that the driver can safely drive the vehicle. In particular, as the accelerator position sensor error is indicated, the driver may rapidly replace the accelerator position sensor with new one, thereby previously preventing an accident caused by the accelerator position sensor error.

Next, the jackrabbit accident controller 122 compares the second jackrabbit analysis information (jackrabbit signal) with the preset reference value (for example, 2.5 V) used to determine the jackrabbit, so that the jackrabbit state or the sudden acceleration state is determined based on the comparison result. For example, if the second jackrabbit analysis information (jackrabbit signal) represents a value less than the reference value, a driving state is determined as being in a normal state. The normal driving state includes a waiting-for-signal state or a stop state. When the vehicle is in the normal state, the second jackrabbit analysis information (jackrabbit signal) represents a value less than 2.5 V in most cases although vehicles have slightly different second jackrabbit analysis information. In this case, the reference value is calculated by performing an experiment for the actual pressing degree of the accelerator and the opening degree (0° to 90°) of the throttle valve If the second jackrabbit analysis information (jackrabbit signal) represents a value more than the reference value according to the comparison result, the driving state is determined as the initial jackrabbit state. In this case, even though the second jackrabbit analysis information (jackrabbit signal) represents the value more than the reference value, the driving state is determined as the initial jackrabbit state instead of the jackrabbit state so that the driving state is exactly determined because a pattern appears extremely similarly to the jackrabbit pattern even if high power is generated in hill driving or sudden acceleration. Actually, when a vehicle is started or suddenly accelerated, the engine control device detects a significant load of the engine to temporarily open the throttle value to the degree greater than the pressing degree of the accelerator. The situation is maintained only within a significantly short time, and the throttle valve is operated in direct proportion together with the accelerator position signal APS1.

The jackrabbit accident controller 122 checks continuity of the initial jackrabbit state if the determination of the initial jackrabbit state is made to determine the initial jackrabbit state as a sudden acceleration state or a sudden braking state if the initial jackrabbit state is returned with the value less than the reference value within a preset time (for example, 1.5 seconds), and to determine the initial jackrabbit state as a final jackrabbit state if the initial jackrabbit state is continued for more than the preset time.

In addition, if the final determination of the sudden acceleration or the sudden braking is made, the jackrabbit accident controller 122 accumulates and stores the number of times of the sudden acceleration or the sudden braking into the internal memory. If the accumulated and stored number of times of the sudden acceleration or the sudden braking exceeds a preset number of times (which may be variably set), the accumulated and stored number of times of the sudden acceleration or the sudden braking is provided for the driver as information of the driving habit of the driver. In order to provide the information of the driving habit for the driver, a display device 400, which is separately realized, and a head unit (audio/image system) basically provided in the vehicle, an additional device, such as navigation, may be used. In addition, data communication may be made with other devices through USB ports or other communication ports.

Meanwhile, if the final determination of the jackrabbit is made, the jackrabbit accident controller 122 drives the jackrabbit state indicator 132 through the state indication and engine stop unit 123 to inform the jackrabbit state to the outside.

In addition, if the driving state is determined as the jackrabbit state, the state indication and engine stop unit 123 transmits the jackrabbit determination signal to a vehicle control device (for example, ECU, or TCU) provided in the vehicle, thereby leading the vehicle to be operated in a fail safe mode. In this case, the engine check lamp is turned on, so that the user may recognise the jackrabbit. In addition, the state indication and engine stop unit 123 generates the fuel pump shutoff signal to stop the engine.

As shown in FIG. 5, the fuel pump power shutoff unit 200 stops the engine by disconnecting the fuse 312 for supplying driving power to the fuel pump according to the fuel pump shutoff signal, which is generated from the jackrabbit accident prevention unit 120, to shut off the driving power of the fuel pump. The fuel pump power shutoff unit 200 typically includes the fuse 312, a relay 313, and a fuel feeding pump 314. In addition, the operation of the relay 313 is controlled according to the control of the engine MCU 302. In other words, if the relay 313 is in an off state, the driving of the fuel feeding pump 314 is an off state. If the relay 313 is in an on state, the fuel feeding pump 314 is operated.

The fuel pump power shutoff unit 200 is interposed between the rear end of the fuse 312 and the ground, and includes the relay 210 or the power transistor driven according to the fuel pump power shutoff signal to ground the fuse 312 so that the fuse 312 is disconnected to shut off the driving power to the fuel pump. Accordingly, the throttle valve is closed to stop the acceleration of the engine, thereby stopping the jackrabbit. In this case, the accelerator is not operated, the engine is maintained in an idle state, and a brake is in an operable state.

In general, the brake is operated by operating a brake vacuum booster using a vacuum state of an intake manifold, or the brake vacuum booster is not operated because of changing the vacuum state of the intake manifold to an atmospheric state as a throttle valve is open in the jackrabbit state, so that the brake is not operated.

Therefore, according to the present invention, the throttle valve is closed in jackrabbit, so that the acceleration of the engine is stopped. Accordingly, the jackrabbit is stopped. In this case, the accelerator is not operated, the engine is maintained in the idle state, and the brake is in an operable state, so that the driver may control the vehicle.

In other words, according to the present invention, if the vehicle state is determined as being in the jackrabbit state by an additional device (particularly, black box) instead of the vehicle control device, the driving power of the fuel pump is rapidly shut off. As described above, the vehicle is rapidly stopped in the jackrabbit by stopping the engine as the fuel feeding is shut off, thereby preventing an accident caused by the jackrabbit.

Although the present invention has been described for illustrative purposes, those skilled in the art will appreciate that various modifications, additions and substitutions are possible, without departing from the scope and spirit of the invention as disclosed in the accompanying claims.

The present invention is applicable to a technology of preventing a jackrabbit accident by determining jackrabbit through an addition device (black box) instead of a vehicle control device based on signals from an accelerator position sensor and a throttle position sensor in a vehicle.

What is claimed is:

1. An apparatus for preventing a jackrabbit accident using a vehicle black box, the apparatus comprising:
   a jackrabbit accident prevention unit that is provided in the vehicle black box, synchronizes an accelerator position signal with a vertical synchronization signal for recording of an image to generate first jackrabbit analysis information, combines the accelerator position signal with a throttle position signal to generate second jackrabbit analysis information, and prevents the jackrabbit accident by automatically shutting off driving power to a fuel pump when determination of the jackrabbit is made; and
   an accident recording unit that is provided in the vehicle black box, provides horizontal and vertical synchronization signals for storing of an image to the jackrabbit accident prevention unit, maps the first jackrabbit analysis information provided by the jackrabbit accident prevention unit with a recorded image, and stores the mapping result in a memory card,
   wherein the jackrabbit accident prevention unit comprises:
      an analog/digital converter that converts the accelerator position signal, which is transmitted from an accelerator position sensor to a main control unit (MCU) for controlling an overall operation of a vehicle, and the throttle position signal, which is transmitted from a throttle position sensor to the main control unit, into accelerator position data and throttle position data, respectively; and
      a jackrabbit accident controller that synchronizes the accelerator position data converted by the analog/digital converter with the vertical synchronization signal to generate the first jackrabbit analysis information, performs a logical operation with respect to the accelerator position data and the throttle position data to generate the second jackrabbit analysis information, determines an error state of an accelerator position sensor or a jackrabbit state based on the second jackrabbit analysis information, and performs a state indication and engine control operation according to the determination result,
   wherein the jackrabbit accident controller determines the accelerator position sensor or a mechanical device related to the accelerator position sensor as being broken or in an abnormal state if the second jackrabbit analysis information represents a negative value, determines the accelerator position sensor or the mechanical device related to the accelerator position sensor as being in a normally operating state if the second jackrabbit analysis information represents a value less than a preset reference value to determine the jackrabbit, and determines the accelerator position sensor or the mechanical device related to the accelerator position sensor as being in an initial jackrabbit state if the second jackrabbit analysis information represents a value equal to or more than the preset reference value.

2. The apparatus of claim 1, wherein the jackrabbit accident controller performs sampling with respect to the accelerator position data output from the analog/digital converter using the vertical synchronization signal to generate the first jackrabbit analysis information.

3. The apparatus of claim 1, wherein the jackrabbit accident controller performs sampling with respect to the throttle position data output from the analog/digital converter using the vertical synchronization signal, and performs an operation with respect to the sampling result and the first jackrabbit analysis information to generate the second jackrabbit analysis information used to determine the jackrabbit.

4. The apparatus of claim 1, wherein the jackrabbit accident controller transmits the accelerator position data and the throttle position data to the accident record unit such that the accelerator position data and the throttle position data are utilized to investigate the jackrabbit.

5. The apparatus of claim 1, wherein the jackrabbit accident controller checks continuity of the initial jackrabbit state if the determination of the initial jackrabbit state is made to determine the initial jackrabbit state as a sudden acceleration state or a sudden braking state if the initial jackrabbit state is returned with the value less than the reference value within a preset time, and to determine the initial jackrabbit state as a final jackrabbit state if the initial jackrabbit state is continued for more than the preset time.

6. The apparatus of claim 5, wherein the jackrabbit accident controller adds up and stores a number of times of the sudden acceleration state or the sudden braking state into an internal memory if the final determination of the sudden acceleration state or the sudden braking state is made, and provides a driver with the added up and stored number of times of the sudden acceleration state or the sudden braking state as information of driving habit of the driver if the added up and stored number of times of the sudden acceleration or the sudden braking exceeds a preset number of times.

7. The apparatus of claim 1, wherein the jackrabbit accident prevention unit further comprises a state indication and engine stop unit that leads the vehicle to operate in a safe mode by transmitting a jackrabbit determination signal to a vehicle control device provided in the vehicle if the jackrabbit accident controller makes determination of final jackrabbit, drives a state indicator, and generates a fuel pump power shutoff signal to stop the engine.

8. The apparatus of claim 7, further comprising: a sensor error state indicator to indicate the error state of the accelerator position sensor to an outside according to an indication control signal generated from the jackrabbit accident prevention unit; and a jackrabbit state indicator to indicate the jackrabbit state to the outside according to an indication control signal generated from the state indication and engine stop unit,
   wherein the sensor error state indicator and the jackrabbit state indicator include light emitting diodes (LEDs).

9. The apparatus of claim 1, further comprising a fuel pump power shutoff unit that stops an engine by disconnecting a fuse for supplying driving power to the fuel pump according to a fuel pump power shutoff signal, which is generated from the jackrabbit accident prevention unit, to shut off the driving power supplied to the fuel pump.

10. The apparatus of claim 9, wherein the fuel pump power shutoff unit is interposed between a rear end of the fuse and a ground terminal, and comprises a relay or a power transistor driven according to the fuel pump power shutoff signal to ground the fuse such that the fuse is disconnected.

* * * * *